US008524792B2

(12) United States Patent
Polasky et al.

(10) Patent No.: US 8,524,792 B2
(45) Date of Patent: Sep. 3, 2013

(54) DEFORMABLE, RIGID POLYSTYRENE FOAM BOARD

(71) Applicant: Owens Corning Intellectial Capital LLC, Toledo, OH (US)

(72) Inventors: Mark E. Polasky, Mogadore, OH (US); Raymond M. Breindel, Hartville, OH (US); Roland R. Loh, Stow, OH (US); Yadollah Delaviz, Lewis Center, OH (US); Bharat Patel, Princeton, NJ (US)

(73) Assignee: Owens Corning Intellectual Capital, LLC, Toledo, CA (US)

( * ) Notice: Subject to any disclaimer, the term of this patent is extended or adjusted under 35 U.S.C. 154(b) by 0 days.

(21) Appl. No.: 13/648,331

(22) Filed: Oct. 10, 2012

(65) Prior Publication Data

US 2013/0030069 A1     Jan. 31, 2013

Related U.S. Application Data

(62) Division of application No. 11/208,987, filed on Aug. 22, 2005, now Pat. No. 8,314,161.

(51) Int. Cl.
B22C 1/22 (2006.01)
B29C 44/34 (2006.01)
B29C 44/46 (2006.01)

(52) U.S. Cl.
USPC .......................................... 521/139; 264/51

(58) Field of Classification Search
USPC ............................. 521/139; 264/51
See application file for complete search history.

(56) References Cited

U.S. PATENT DOCUMENTS

| | | | |
|---|---|---|---|
| 3,969,191 A | 10/1972 | Bonner, Jr. |
| 5,057,169 A | 10/1991 | Adelman |
| 5,332,761 A | 7/1994 | Paquet et al. |
| 5,354,402 A | 10/1994 | Luetkens et al. |
| 5,670,552 A | 9/1997 | Gusavage et al. |
| 5,962,545 A | 10/1999 | Chaudhary et al. |
| 5,993,707 A | 11/1999 | Chaudhary et al. |
| 6,048,909 A | 4/2000 | Chaudhary et al. |
| 6,054,529 A | 4/2000 | O'Donnell et al. |
| 6,063,823 A | 5/2000 | Nakatani et al. |
| 6,069,183 A | 5/2000 | Wilkes et al. |
| 6,130,265 A | 10/2000 | Glueck et al. |
| 6,174,471 B1 | 1/2001 | Park et al. |
| 6,225,363 B1 | 5/2001 | Wilkes et al. |
| 6,268,046 B1 | 7/2001 | Miller et al. |
| 6,310,112 B1 | 10/2001 | Vo et al. |
| 6,355,341 B1 | 3/2002 | Chaudhary et al. |
| 6,521,672 B1 | 2/2003 | Gluck et al. |
| 6,666,998 B2 | 12/2003 | Berhaus et al. |
| 8,314,161 B2 | 11/2012 | Polasky et al. |
| 2007/0043131 A1 | 2/2007 | Polasky et al. |
| 2007/0149628 A1 | 6/2007 | Delaviz et al. |

FOREIGN PATENT DOCUMENTS

| | | |
|---|---|---|
| GB | 2288143 | 10/1995 |
| JP | 358089623 | 5/1983 |
| JP | 60-086130 | 5/1985 |
| JP | 2006-131757 | 5/2006 |
| WO | 96/16111 | 5/1996 |
| WO | 98/58991 | 6/1998 |
| WO | 01/51550 | 7/2001 |
| WO | 2007/024682 | 3/2007 |

OTHER PUBLICATIONS

Office action from U.S. Appl. No. 11/208,987 dated Feb. 25, 2008.
Office action from U.S. Appl. No. 11/208,987 dated Sep. 16, 2008.
Office action from U.S. Appl. No. 11/208,987 dated Dec. 22, 2008.
Office action from U.S. Appl. No. 11/208,987 dated Apr. 8, 2009.
Office action from U.S. Appl. No. 11/208,987 dated Dec. 7, 2009.
Office action from U.S. Appl. No. 11/208,987 dated May 12, 2010.
Office action from U.S. Appl. No. 11/208,987 dated Sep. 17, 2010.
Advisory Action from U.S. Appl. No. 11/208,987 dated Jun. 9, 2011.
Office action from U.S. Appl. No. 11/208,987 dated Aug. 26, 2011.
Office action from U.S. Appl. No. 11/208,987 dated Dec. 29, 2011.
Notice of allowance from U.S. Appl. No. 11/208,987 dated Jul. 23, 2012.
Office action from U.S. Appl. No. 11/708,889 dated Feb. 21, 2008.
Office action from U.S. Appl. No. 11/708,889 dated Oct. 15, 2008.
Office action from U.S. Appl. No. 11/708,889 dated Dec. 30, 2008.

(Continued)

Primary Examiner — Liam Heincer
(74) Attorney, Agent, or Firm — Calfee, Halter & Griswold LLP

(57) ABSTRACT

Provided are methods for producing a high strength, but easily deformed, polystyrene foam board that can endure repeated deformations from its original configuration into more complex curved shapes without damaging the board integrity or substantially reducing its structural strength. Also provided are rigid polystyrene foam boards produced by this method that exhibit improved bending and impact resistance while substantially retaining or improving other properties, for example, the thermal dimensional stability and fire resistance, exhibited by corresponding conventional XPS foam boards. The foamable compositions may incorporate one or more of a variety of polymer processing aids for the purpose of altering the performance of the final foam products, thereby allowing the properties of the final foam product to be customized to some degree.

12 Claims, 3 Drawing Sheets

(56) References Cited

OTHER PUBLICATIONS

Office action from U.S. Appl. No. 11/708,889 dated Feb. 12, 2009.
Office action from U.S. Appl. No. 11/708,889 dated Mar. 27, 2009.
Office action from U.S. Appl. No. 11/708,889 dated Sep. 29, 2009.
Office action from U.S. Appl. No. 11/708,889 dated May 12, 2010.
Office action from U.S. Appl. No. 11/708,889 dated Oct. 28, 2010.
Advisory Action from U.S. Appl. No. 11/708,889 dated Mar. 7, 2011.
Office action from U.S. Appl. No. 11/708,889 dated Oct. 6, 2011.
Office action from U.S. Appl. No. 11/708,889 dated Jan. 3, 2013.
International Search Report and Written Opinion from PCT/US06/32317 dated Sep. 7, 2007.
Office action from Canadian Application No. 2,616,142 dated Jan. 10, 2013.
Office action from Chinese Application No. 200680030498.X dated Nov. 3, 2010.
Office action from Japanese Application No. 2008-528011 dated Oct. 9, 2012.
EVAL LC-F101BZ (Ethylene Vinyl Alcohol Copolymer Resin Plastic Material Data sheet), 2004, Kipp, Dale O., MatWeb-Division of Automation Creation, Inc., Online version available at: http://knovel.com/web/portal/browse/display?_EXT_KNOVEL_DISPLAY_bookid=1023&VerticalID=0.
EVAL Americas, EVAL F101 Data sheet, 2007.
Office action from U.S. Appl. No. 11/708,889 dated Jun. 6, 2013.
Office action from Mexican Application No. MX/a/2008/002469 dated May 2, 2013, received on Jun. 27, 2013 along with English translation of relevant portions of action.

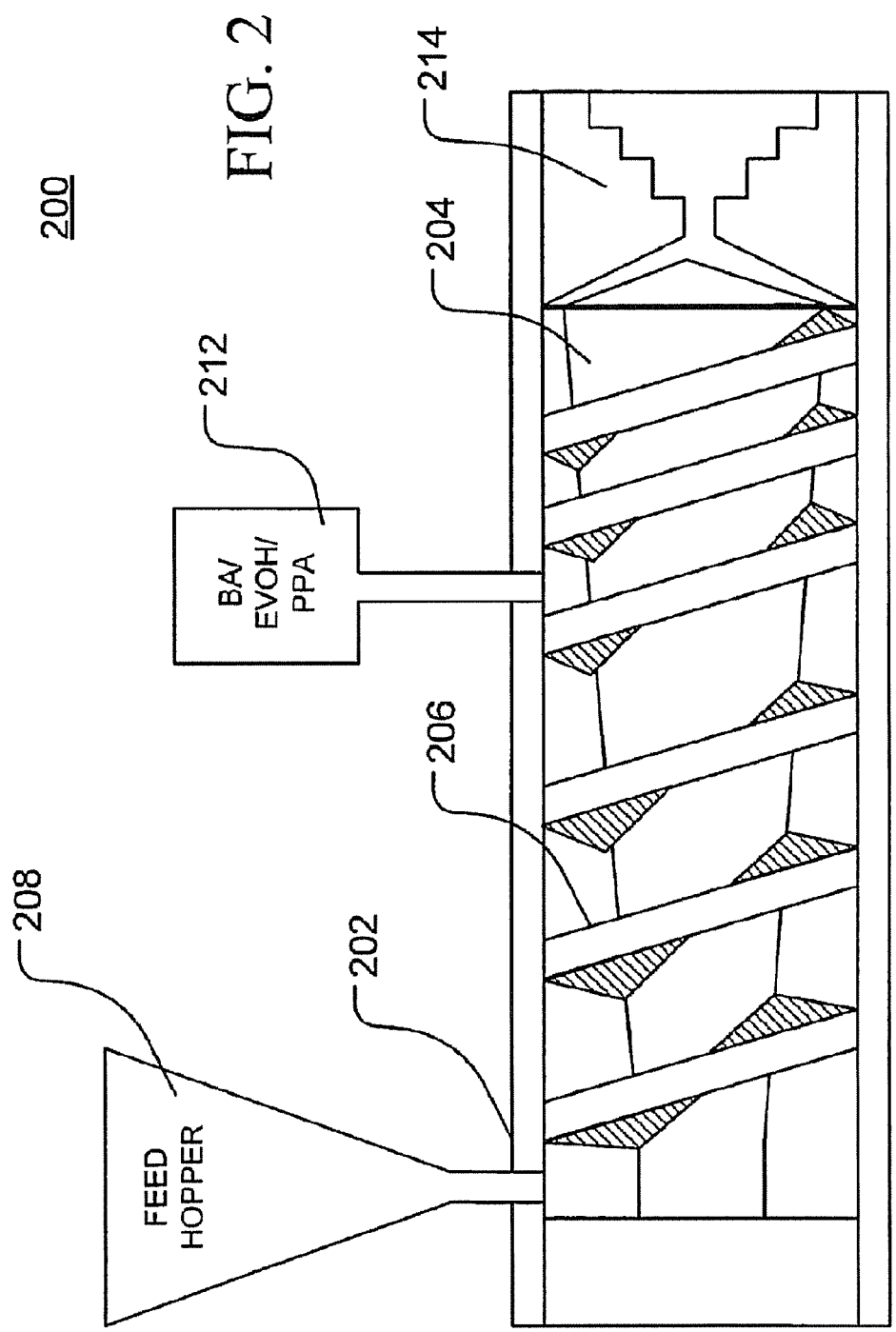

DEFORMABLE, RIGID POLYSTYRENE FOAM BOARD

This is a divisional application of and claims priority to U.S. patent application Ser. No. 11/208,987, filed Aug. 22, 2005, the disclosure of which is herein incorporated by reference in its entirety.

TECHNICAL FIELD AND INDUSTRIAL APPLICABILITY

The present invention relates to compositions and methods for producing high strength-easy deformation (HS-ED) rigid extruded polystyrene (XPS) foam board suitable for insulation applications, particularly for exterior insulation finish system (EIFS) for building construction, highway insulation structures having a non-planar surface and structural foam products. The rigid polystyrene foam board produced according to the invention may also exhibit improved impact resistance relative to corresponding foam board products produced using conventional compositions and methods and may, therefore, be suitable for structural foam products as well. The present invention may also be applied to both conventional cellular foams (i.e., typically exhibiting cell densities of around $10^4$-$10^6$ cells/cm$^3$), microcellular foams (i.e., those typically having cell densities of around $10^7$-$10^9$ cells/cm$^3$) and possibly ultramicrocellular foams (i.e., those typically having cell densities of around $10^9$-$10^{12}$ cells/cm$^3$). As the average cell size decreases for a given material, the expansion factor also decreases and the polymer strength tends to be increased for maintaining cell integrity, by at least in part reducing cell coalescence and maintaining relatively thicker cell walls.

BACKGROUND OF THE INVENTION

This invention relates to foam insulating products, particularly extruded polystyrene foam, containing a minor amount of one or more additives including, for example, one or more vinyl resins, sufficient to achieve a desired combination of flexibility and strength. The rigid extruded polystyrene foam boards manufactured according to the invention can be deformed repeatedly at room temperature in the process of creating shaped board forms having one or more curvatures, bends or deformations, without resiling, cracking or breaking, while substantially retaining the thermal and physical properties of the original, non-deformed board.

As will be appreciated, the ability to deform expanded foam insulation boards into various shapes to fit within the architectural design of a structure while tending to preserve its structural and insulating integrity is particularly advantageous for construction applications. This ability is also desirable for expanded foam insulation boards intended for use as exterior wall insulation board or as highway underground insulation board for concrete structures having waved, curved, oscillating or other rounded complex profiles.

SUMMARY OF THE INVENTION

The present invention relates to producing a high strength-easy deformation (HS-ED) rigid polystyrene foam board that can be repeatedly deformed from its original substantially planar configuration into a curved shape without resiling, cracking or otherwise damaging the board integrity or substantially reducing the structural strength of the board, even after repeated deformations. The present invention produces rigid polystyrene foam boards that exhibit improved bending and impact resistance, thereby improving the performance and handling of thin rigid XPS foam board, while substantially retaining or improving other properties, for example, the thermal dimensional stability and fire resistance, exhibited by corresponding conventional XPS foam boards.

A variety of polymer processing aids (PPAs) may be included in the polymer melt in order to alter the processing performance of the polymer melt including, for example, reducing melt fractures, improving surface properties in a variety of polyolefin articles, improving stability, reducing shear, increasing output with similar or reduced force, improving temperature control of the melt and reducing melt friction. Similarly, the composition of the base polymer can be altered through the addition of one or more other polymers and copolymers to the melt to form a blended composition for producing a foam that exhibits properties and performance that are different from that of the base polystyrene. In this manner the properties of the final foam product can be customized to some degree for various intended applications.

DESCRIPTION OF THE DRAWINGS

The features and operation of the invention will be apparent from the following more detailed description of various embodiments and as illustrated in the accompanying drawings. These drawings are provided for illustrative purposes only and are not drawn to scale. The spatial relationships and relative sizing of the elements illustrated in the various embodiments may have been reduced, expanded or rearranged to improve the clarity of the figure with respect to the corresponding description. The figures, therefore, should not be interpreted as accurately reflecting the relative sizing or positioning of the corresponding structural elements that could be encompassed by the example embodiments of the invention.

FIG. 2 is a schematic drawing of another exemplary extrusion apparatus useful for practicing methods according to the invention;

Figure 1:
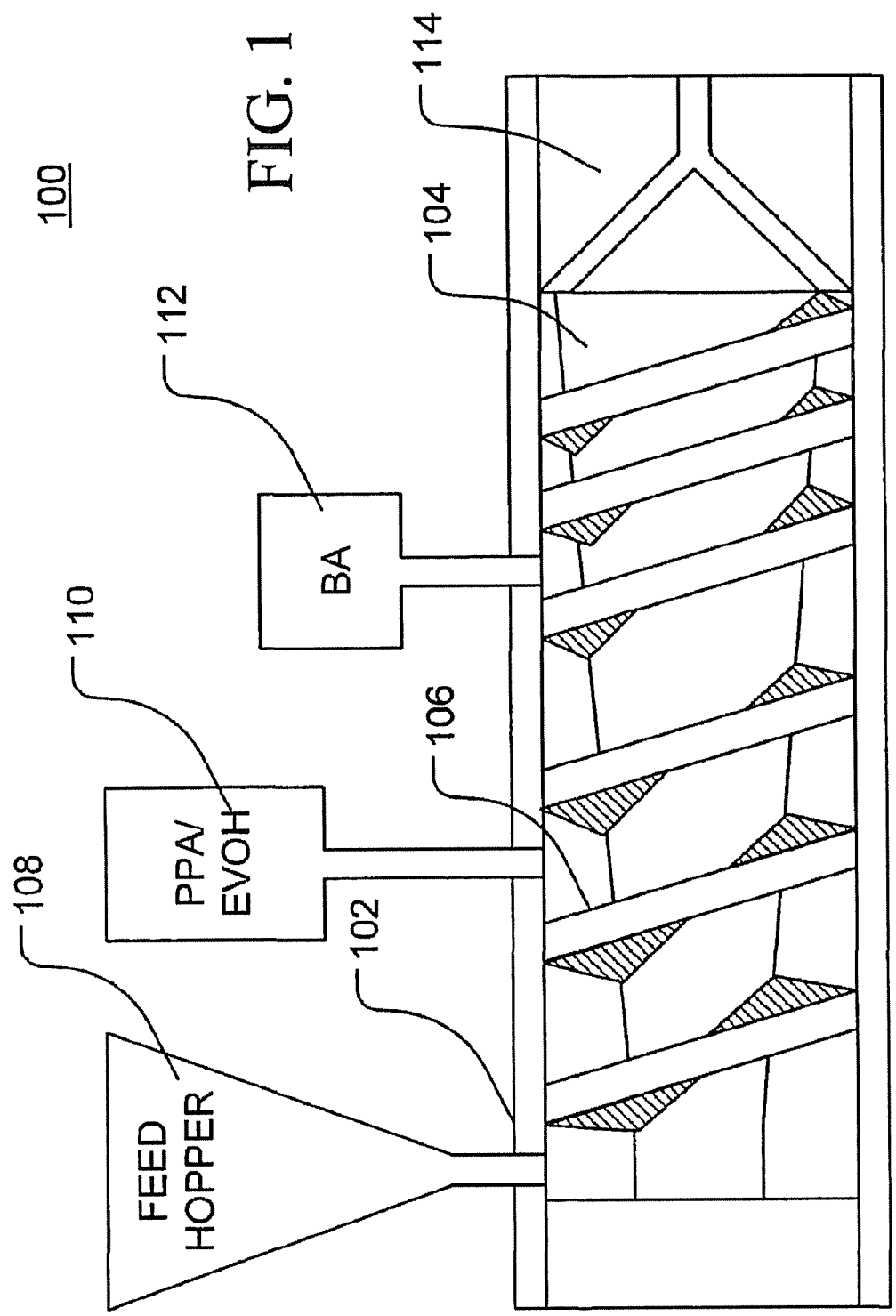
FIG. 1 is a schematic drawing of an exemplary extrusion apparatus useful for practicing methods according to the invention.

The embodiments detailed below are provided so that this disclosure will be thorough and complete and will fully convey the scope of the invention to those skilled in the art. The principles and features of this invention may be employed in varied and numerous embodiments without departing from the scope of the invention. Indeed, those of ordinary skill in the art will readily appreciate that various of the components illustrated in FIGS. 1 and 2 may be altered or otherwise modified to provide a range of extruder configurations. As will be appreciated, however, it is primarily the composition of the extrudate, rather than the particular extruder configuration, that provides the unexpected advantages detailed below.

DETAILED DESCRIPTION OF EXAMPLE EMBODIMENTS

Foam boards according to the invention, particularly polystyrene foam boards, are formed by incorporating an amount of one or more vinyl resins into the polymeric melt effective to achieve increased flexibility while substantially maintaining the strength of the resulting foam board products manufactured from polystyrene or polystyrene blended with other polymers and/or copolymers. Accordingly, rigid extruded polystyrene foam boards manufactured according to the invention can be easily and repeatedly deformed at ambient temperatures to produce relative small radii of curvature when compared with corresponding conventional XPS foam without resiling, cracking or breaking, and while generally retaining other desirable properties of conventional foams. This combination of flexibility and strength makes rigid extruded polystyrene foam boards manufactured according to the invention particularly suitable for producing complex shaped forms.

The rigid, closed cell, polymer foam according to the invention may be prepared using a conventional extruding process with vinyl resin selected from the group consisting of vinyl acetate (EVA), polyvinylalcohol (PVA), vinyl alcohol/ethylene copolymer (EVOH), polyvinylidene chloride (PVDC), polyvinyl chloride (PVC), vinyl chloride/vinylidene chloride copolymer, and vinylidene chloride/methylacrylate copolymer, one or more blowing agent and other additives and/or PPAs. Without being bound by any particular theory, it is suspected that the benefits, associated with incorporating one or more vinyl resins in a polystyrene or polystyrene blend resin, particularly the improved deformability of the resulting foams, are attributable, at least in part, to the hydrogen bonding of the vinyl resin's hydroxyl group. Consistent with this theory, other polymers and copolymers including, for example, polyacids and polyamides, containing appropriate hydroxyl or other polar substituents may exhibit similar functionality.

A representative vinyl resin is an ethylene vinyl alcohol (EVOH) copolymer resin having ethylene copolymer ratio of about 20 to 40 mol %, more typically about 30 to about 34 mol % (as determined using the Kuraray EV-QC-4.17 test method), a melt index of about 1 to 2, more typically about 1.4 to about 1.8 g/10 min at 190° C. and about 2.5 to about 5 g/10 min, and more typically about 3 to about 4 g/10 min at 210° C. (as determined using the ASTM-D1505 test method).

Extruded polystyrene polymer foams of this invention may be prepared in both twin-screw (low shear), and single screw (high shear) extruders. A typical extruder comprises multi-feeders containing pellets or beads of the selected vinyl resin or combination of vinyl resins that will be incorporated into the polystyrene melt as it is forced through the extruder being added into the extruder along with the basic polymer composition and any other PPAs or additives through a number of feed inlets. The general procedure utilized in the preparation of extruded foam products includes the steps of melting the base polymeric composition, incorporating one or more blowing agents and other additives into the polymeric melt. These compositions are prepared under conditions that are intended to result in the thorough mixing of the blowing agent(s), additives and the base polymer while preventing the mixture from foaming prematurely, e.g., by maintaining the blended composition under relative high pressure at least until the mixing process has been completed.

This foamable mixture is then typically adjusted to a target die temperature that may be somewhat below the temperature at which the foamable mixtures exits the extruder. The foamable mixture is then extruded through a single or multi-stage extrusion die to reduce the pressure on the foamable mixture to atmospheric or even subatmospheric pressure, allowing the mixture to foam and produce a foamed product. The rapid expansion tends to produce some cooling of the foamed composition, but supplemental cooling, such as immersion baths, may be utilized for more rapid cooling.

As will be appreciated, the relative quantities of the polymer(s), blowing agent(s) and additives, as well as the foaming temperature and the manner in which the pressure is reduced (e.g., in stages or in a single step) and the environment into which the polymer is extruded and any subsequent processing will tend to affect one or more of the surface quality and mechanical properties of the resulting foam product. After the extrusion step, the foam may be subjected to additional processing steps included, for example dynamic/static cooling, shaping, cutting and packaging.

As illustrated in FIG. 1, an extrusion apparatus 100 useful for practicing methods according to the invention may comprise a single or double (not shown) screw extruder including a barrel 102 surrounding a screw 104 on which are provided a spiral flight 106 configured to compress, and thereby, heat material introduced into the screw extruder. As illustrated in FIG. 1, the basic polymeric composition can be feed into the screw extruder as a flowable solid, such as beads, granules or pellets, or as a liquid or semiliquid melt, from one or more (not shown) feed hoppers 108.

As the basic polymeric composition advances through the screw extruder, the decreasing spacing of the flight 106, define a successively smaller space through which the polymer composition is forced by the rotation of the screw. This decreasing volume acts to increase the temperature of the polymer composition to obtain a polymeric melt (if solid starting material was used) and/or to increase the temperature of the polymeric melt.

As the polymer composition advances through the screw extruder 100, one or more ports may be provided through the barrel 102 with associated apparatus 110 that can be configured for injecting EVOH and one or more additional polymer processing aids into the polymer composition. Similarly, one or more ports may be provided through the barrel 102 with associated apparatus 112 for injecting one or more blowing agents into the polymer composition. Once the polymer processing aid(s) and blowing agent(s) have been introduced into the polymer composition, the resulting mixture is subjected to some additional blending sufficient to distribute each of the additives generally uniformly throughout the polymer composition to obtain an extrusion composition.

This extrusion composition is then forced through an extrusion die 114 and exits the die into a region of reduced pressure (which may be below atmospheric pressure), thereby allowing the blowing agent to expand and produce a polymeric foam layer or slab. The polymeric foam may be subjected to additional processing such as calendaring, water immersion, cooling sprays or other operations to control the thickness and other properties of the resulting polymeric foam product.

As illustrated in FIG. 2, an extrusion apparatus 200 useful for practicing methods according to the invention may comprise a single or double (not shown) screw extruder including a barrel 202 surrounding a screw 204 on which are provided a spiral flight 206 configured to compress, and thereby, heat material introduced into the screw extruder. As illustrated in FIG. 2, the basic polymeric composition, optionally compounded with an EVOH and one or more additional polymer processing aids, can be feed into the screw extruder as a flowable solid, such as beads, granules or pellets, or as a liquid or semiliquid melt, from one or more (not shown) feed hoppers 208.

As the basic polymeric composition advances through the screw extruder, the decreasing spacing of the flight 206, define a successively smaller space through which the polymer composition is forced by the rotation of the screw. This decreasing volume acts to increase the temperature of the polymer composition to obtain a polymeric melt (if solid starting material was used) and/or to increase the temperature of the polymeric melt.

As the polymer composition advances through the screw extruder 200, one or more ports may be provided through the barrel 202 with associated apparatus 212 configured for injecting one or more blowing agents and, optionally one or more polymer processing aids, into the polymer composition. Once the desired quantities of polymer, polymer processing aid(s) and blowing agent(s) have been introduced into the screw extruder, the resulting mixture is subjected to some additional blending sufficient to distribute each of the additives generally uniformly throughout the polymer composition to obtain an extrusion composition.

This extrusion composition is then forced through an extrusion die 214 and exits the die into a region of reduced pressure (which may be below atmospheric pressure), thereby allowing the blowing agent to expand and produce a polymeric foam layer or slab. As illustrated in FIG. 2, this pressure reduction may be obtained gradually as the extruded polymeric mixture advances through successively larger openings provided in the die or through some suitable apparatus (not shown) provided downstream of the extrusion die for controlling to some degree the manner in which the pressure applied to the polymeric mixture is reduced. The polymeric foam may also be subjected to additional processing such as calendaring, water immersion, cooling sprays or other operations to control the thickness and other properties of the resulting polymeric foam product.

An XPS foam product according to the invention may be manufactured in a foaming operation having a melt mixing temperature from about 200 to about 250° C., typically around 240° C., a die melt temperature of about 100 to about 130° C., typically around 120° C., and a die pressure of about 50 to 80 bar (5 to 8 MPa), typically around 60 bar (6 MPa) when using a HCFC 142b blowing agent, with or without incorporating carbon dioxide as an additional blowing agent or other blowing aid. The expansion ratio, i.e., the ratio of the foam thickness to the extrusion die gap, may be in the range from about 20 to 70, typically around 60.

A variety of blowing agents may be utilized in forming the foamable mixture including HCFCs, HFCs, $CO_2$, $H_2O$, inert gases, hydrocarbons and mixtures thereof. As those skilled in the art with appreciate, although certain blowing agents may be useful in practicing the invention, there are other considerations, particularly the apparent contribution of CFC compounds, and perhaps HCFC and HFC compounds as well, to the degradation of Earth's ozone layer tend to limit their widespread use. Hydrocarbons, for example pentane, hexane and cyclopentane, are more ozone friendly, raise both safety and VOC emission concerns.

Conventional blowing systems may include a composition including one or more blowing agents, which may also be combined for injection with one or more PPAs. Such systems include, for example, HCFC-142b comprising from about 8 to about 14%, more typically about 11% of the foamable mixture; HFC-134a comprising from about 4 to about 10%, more typically about 5.5%, in combination with about 3% ethanol; carbon dioxide comprising from about 3 to about 6%, typically about 3.5 to about 4.0% in combination with about 1.8% ethanol and/or with one or more additional PPAs. The PPAs may be used for increasing the solubility or distribution of the blowing agent throughout the foamable mixture and/or for altering one or more properties of the completed foam product, for example the percent of open cells, surface quality and foam density.

The invention was demonstrated by preparing representative examples of the inventive rigid polystyrene foam boards and a comparative example of a conventional rigid polystyrene foam board using both 1) a twin screw LMP extruder in combination with a flat die and shaper plate and 2) a single screw tandem extruder in combination with a radial die and slinky shaper. The foam may exit the Vacuum may also be applied in both the above pilot and manufacturing lines.

TABLE 1 shows the process conditions for examples and control example without EVOH additive in a twin screw extruder. EVOH copolymer is prepared from Eval Company of America's F171 32 mol % EVAL grade material. The polystyrene resin used was NOVA 1220 from NOVA Chemical Inc. having a melt index of about 1.6 g/10 minutes. Stabilized hexabromocyclododecane (Great Lakes Chemical, HBCD SP-75) was incorporated as a flame retarding agent at a concentration of about 1% by weight of the solid foam polymer. Other additives included about 0.5% by weight talc and trace of colorant.

TABLE 1

| Component/Parameter | Examples | Control Example |
|---|---|---|
| Wt % of EVOH | 0.5-2.5 | 0 |
| Wt % of talc | 0.5 | 0.5 |
| Wt % of $CO_2$ | 3.7 | 3.7 |
| Wt % of Ethanol | 1.5 | 1.5 |
| Extruder Pressure, kPa (psi) | 13000-17000 (1885-2466) | 15800 (2292) |
| Die Melt Temperature, ° C. | 117-123 | 121 |
| Die Pressure, kPa (psi) | 5400-6600 (783-957) | 5600 (812) |
| Line Speed, m/hr (ft/min) | 110-170 (6-9.3) | 97 (5.3) |
| Throughput, kg/hr | 100 | 100 |
| Die Gap, mm | 0.6-0.8 | 0.8 |
| Vacuum, kPa (inch Hg) | 0-54 (0-16) | 51 (15) |

Two inventive and one comparative example of the resulting XPS foam products having different EVOH concentrations and physical dimensions and foam properties as reflected below in TABLE 2 were then subjected to certain compressive strength and deformation (bending) evaluations.

TABLE 2

|  | Control | Example 1 | Example 2 |
|---|---|---|---|
| EVOH Wt % | 0 | 2.5 | 0.5 |
| Thickness of Board - mm (inches) | 26.64 (1.049) | 25.50 (1.004) | 25.17 (0.991) |
| Density, kg/m$^3$ | 29 | 33 | 30 |

The results of the compressive strength and deformation (bending) evaluations are detailed below in TABLE 3.

TABLE 3

|  | Control | Example 1 | Example 2 |
|---|---|---|---|
| Compressive Strength, kPa, Bending Tests[1] | 221 | 234 | 214 |
| $R_f$, mm (inches)[2] | 813 (32) | 38.1 (1.5) | 45.7 (1.8) |
| $R_c$, mm (inches)[3] | NA | 50.8 (2) | 50.8 (2) |
| $T_r$[4] | NA | >10 | >10 |

[1]The test method used in bending tests are detailed below in Paragraphs [0039-44] as applied to samples cut from the sheets with larger dimensions being oriented transverse to the extruding direction.
[2]$R_f$ is the radius at failure as further defined below.
[3]$R_c$ is the critical radius as further defined below.
[4]$T_r$ is a measure of the number of times the panel can approach $R_c$ without failing.

As can be seen in TABLE 2, the addition of minor portions of EVOH, e.g., no more than about 2.5% by weight EVOH based on the solid foam polymer, to the foamable polystyrene mixture tended to maintain the compressive strength while significantly improving the flexibility and the durability of the of the resulting XPS product. In addition to maintaining the compressive strength, the example composition foams were comparable to the control foam with respect to both thermal conductivity, around 0.2 w/m·k thermal conductivity (aged 180 days), and flame retarding, around 15 to 17 seconds burn time for small scale burning test.

The invention thus provides a high strength-easy deformation (HS-ED) rigid polystyrene foam board which broadens the range of insulation applications for which XPS insulation may be used, e.g., those that necessitate forming different complex shapes, and simplifies the installation by reducing or eliminating the need to cut and seal conventional insulating sheets or maintain custom or semicustom configurations for complex shapes, thereby reducing construction labor costs while maintaining or improving the insulating performance of the installed product.

The deformation (bending) performance of the inventive foam compositions and a conventional foam composition as reported above in TABLE 3 was evaluated using the following procedure(s).

Bending Tests

The Applicants are not aware of a conventional ASTM or ISO equivalent for this test, but developed this guided bending test for evaluating and quantifying the relative flexibility/ductility of various foam samples. This test is not intended to and does not purport to address all of the rigid foam mechanical flexibility properties, such as apparent bending modulus (as determined by ASTM D747), or to distinguish between elastic and plastic components. This test does, however, provide a relatively simple evaluation of an apparent value of the allowed bending radius as well as a measure of the durability of the foam board by bending the foam board up to ten times (or to failure if the board is not sufficiently durable to endure the repeated deformations).

Other tests that could be used for evaluating the performance of XPS foam products include bending tests addressing various types of bends including free bending, guided bending (for example, ASTM E190), semi-guided bending (for example, ASTM E290), and wrap around bending. Other tests include cantilevered beam bending modulus (for example, ASTM D747) which determine the apparent bending modulus by measuring force and angle of bend of a cantilever beam.

The tests were conducted on rectangular test samples cut from the XPS sheets measuring 4 inches×24 inches (10×61 cm). The thickness of test samples reflected the thickness of the product sheets being tested. These test samples were then subjected to the two different bending tests.

Figure 3A:
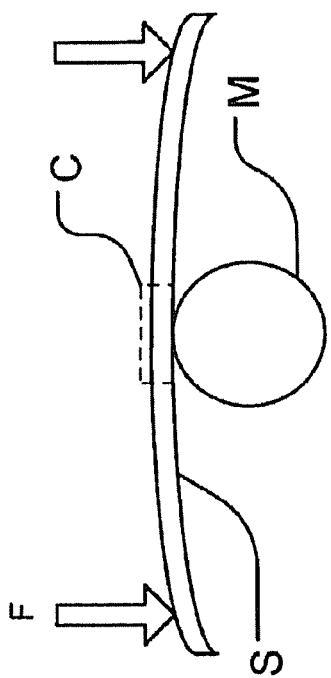
FIGS. 3A and 3B illustrate a first bending test procedure.
Figure 3B:
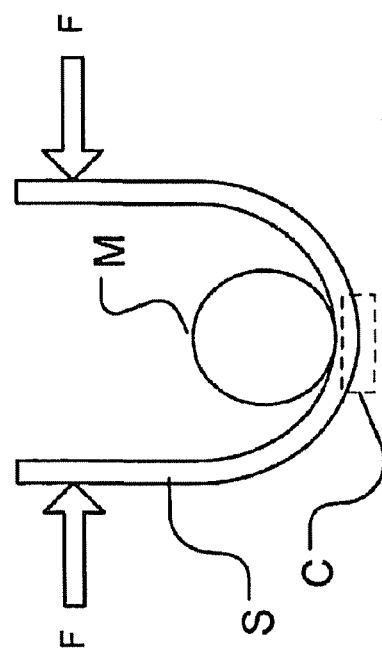

As illustrated in FIGS. 3A and 3B, Test A was a semi-guided bending test, in which the test samples were placed above the bending guide fixture FIG. 3A (the guide fixture being a steel tube having a diameter selectable from 2 inches to 6 inches (5 cm to 15 cm)) and sufficient force was applied to hold down both sides of the sample. As the sample was being deformed, the central convex region C of the sample was then examined for cracking or other strain-induced defects that would indicate sample failure. The deflection or midordinate, $\Delta$, at failure was recorded for each sample. The radius at failure, $R_f$, was then calculated according to formula I:

$$R_f = (L^2/8\Delta) + \Delta/2 \quad (I)$$

in which L=chord length for measuring deflection (24 inches for these samples) and $\Delta$=the deflection or midordinate, in inches.

Figure 4A:
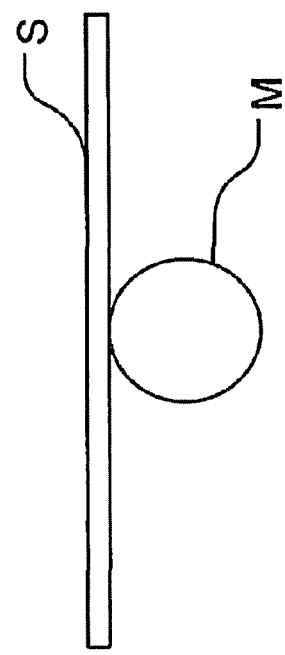
FIGS. 4A and 4B illustrate a second bending test procedure.
Figure 4B:
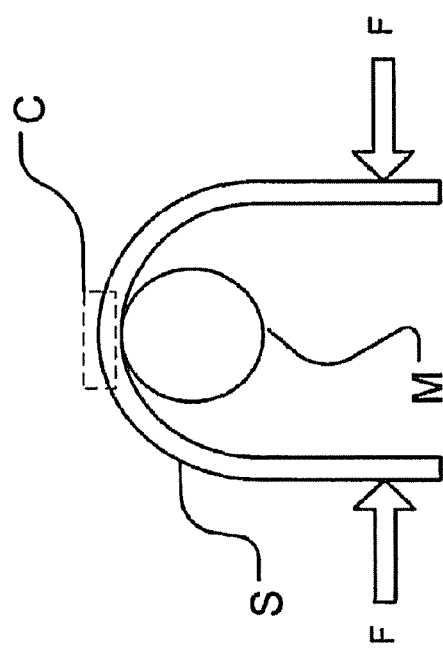

As illustrated in FIGS. 4A and 4B, Test B was a parallel-on-itself 180° bending test, in which the test procedures are as follows by using the same bending guide fixture utilized in the Test A procedure. The samples were placed above the bending guided fixture and sufficient force, F, was applied to bring the opposite sides of the sample into a parallel orientation, FIG. 4A, the separation between the parallel sides, and consequently the radius of the arcuate portion of the sample, was reduced until the sample failed, e.g., cracked in the central convex region. This radius was recorded as the critical radius, $R_c$.

As illustrated in FIG. 4B, the samples were then repeated bent to near this critical radius first in a primary direction and then in the reverse direction (indicated in dashed lines) until cracking was observed occurred on central convex surface of the sample or until 10 bending cycles had been completed. The number of cycles endured by the sample, $T_r$, was recorded at failure or upon termination of the test, i.e., $T_r>10$.

Although non-limiting example embodiments of the invention have been described in detail above, it should be understood that many variations and/or modifications of the basic inventive concepts taught herein, which may be readily apparent to those skilled in the art, will still fall within the spirit and scope of the example embodiments of the invention and as defined in the appended claims.

What is claimed is:

1. A method of producing a deformable, non-resilient foam board capable of being formed into a curved shape without significantly resiling, cracking, or otherwise damaging the integrity of the foam board, wherein the foam board is formed from an expanded, solidified molten blend of polystyrene and a vinyl polymer having a melt index of 1 to 2 grams/10 minutes at 190° C., the vinyl polymer containing 20 to 40 mol % copolymerized vinyl alcohol, wherein the amount of vinyl polymer in the molten blend is sufficient so that
   (a) the foam board contains 0.2 to 1.1 weight % copolymerized vinyl alcohol, and further so that
   (b) a transverse sample of the foam board having a nominal thickness of 1 inch (about 2.54 cm) exhibits a radius at failure, $R_f$, of less than 12 inches (about 30.5 cm),
   and wherein the amount of vinyl polymer contained in the molten blend is no greater than 2.5 weight %.

2. The method of claim 1, wherein the vinyl polymer has a melt index of 14-1.8 grams/10 minutes at 190° C.

3. The method of claim 1, wherein the vinyl polymer contains 30-34 mol % copolymerized vinyl alcohol.

4. The method of claim 1, wherein a transverse sample of the foam board having a nominal thickness of 1 inch (about 2.54 cm) exhibits a radius at failure, $R_f$, of less than 6 inches (about 15.2 cm).

5. The method of claim 1, wherein a transverse sample of the foam board having a nominal thickness of 1 inch (about 2.54 cm) exhibits a radius at failure, $R_f$, of less than 4 inches and a critical radius, $R_c$, of less than 6 inches (about 15.2 cm) according to Test Procedure B.

6. The method of claim 1, wherein the foam board is capable of withstanding repeated deformation.

7. The method of claim 1, further comprising deformation of the foam board into a curved shape suitable for installation into a structure to provide insulation.

8. The method of claim 7, further comprising use of the curved foam board to provide insulation for an exterior wall comprising a rounded complex profile.

9. The method of claim 7, further comprising use of the curved foam board to provide insulation for a concrete structure comprising a rounded complex profile.

10. The method of claim 1, wherein the non-resilient foam board is closed cell.

11. A deformable non-resilient foam board produced by the method of claim 1.

12. A curved non-resilient foam board produced by the method of claim 8.

* * * * *